United States Patent [19]

Walker et al.

[11] Patent Number: 4,716,194

[45] Date of Patent: Dec. 29, 1987

[54] REMOVABLE PRESSURE SENSITIVE ADHESIVE

[75] Inventors: James L. Walker, Whitehouse Station; Paul B. Foreman, Somerville, both of N.J.

[73] Assignee: National Starch and Chemical Corporation, Bridgewater, N.J.

[21] Appl. No.: 801,251

[22] Filed: Nov. 25, 1985

[51] Int. Cl.$^4$ .................. C08L 33/06; C08L 43/04
[52] U.S. Cl. .................... 524/806; 428/447; 524/837; 525/100; 526/279; 528/26
[58] Field of Search ............... 524/806, 837; 526/279; 428/446, 447; 525/100; 528/26

[56] References Cited

U.S. PATENT DOCUMENTS

| | | | |
|---|---|---|---|
| 3,408,420 | 10/1968 | Wiggill | 260/827 |
| 3,617,362 | 11/1971 | Bemmels et al. | 117/122 |
| 3,637,615 | 1/1972 | Coffman | 260/80.73 |
| 3,644,245 | 2/1972 | Flanagan et al. | 260/23 |
| 3,706,697 | 12/1972 | Beckderf | 260/29.2 M |
| 3,707,518 | 12/1972 | Bemmels et al. | 260/29.6 NR |
| 3,729,438 | 4/1973 | Plesich et al. | 260/29.6 R |
| 3,776,977 | 12/1973 | Chadra | 260/825 |
| 4,112,213 | 9/1978 | Waldman | 526/279 |
| 4,146,585 | 3/1979 | Ward et al. | 260/32.8 R |
| 4,291,136 | 9/1981 | Keogh | 525/102 |
| 4,333,867 | 6/1982 | Sauntson | 524/547 |
| 4,343,917 | 10/1982 | Keogh | 525/106 |
| 4,434,272 | 2/1984 | Keogh | 525/100 |

FOREIGN PATENT DOCUMENTS

| | | |
|---|---|---|
| A36824 | 12/1984 | Australia . |
| 1205246 | 5/1986 | Canada . |
| 0109177 | 5/1984 | European Pat. Off. . |
| 1430136 | 3/1976 | United Kingdom . |
| 2070629 | 9/1981 | United Kingdom ......... 524/806 |

*Primary Examiner*—Wilbert J. Briggs, Sr.
*Attorney, Agent, or Firm*—Ellen T. Dec; Edwin M. Szala

[57] ABSTRACT

The removability of acrylate based pressure sensitive adhesives is substantially improved by the addition thereto of a small amount of an organofunctional silane monomer.

19 Claims, No Drawings

REMOVABLE PRESSURE SENSITIVE ADHESIVE

BACKGROUND OF THE INVENTION

This invention relates to a polymer composition containing low levels of reactive silanes. More particularly, the invention is directed to the use of such silane containing polymers as removable pressure sensitive adhesives.

There are a number of situations where it is desirable to provide an adhesive which has low initial tack and which may be readily peeled off the substrate to which it has been applied. Such adhesives are required for use, for example, on masking tape, on removable labels, on bumper stickers, etc. In such cases, conventionally employed adhesives have either had such low initial tack that the tapes or labels accidently fall off or they have provided bonds which tend to become gradually stronger so that after some hours, days or months, the tapes or labels can no longer be removed without delaminating either the tape or label or the substrate, a problem referred to as adhesion buildup.

Previous attempts to prevent adhesion buildup have often involved the addition of plasticizers to the adhesive composition. This technique has the disadvantage of migration of the plasticizer out of the adhesive causing staining of the porous substrates on which it is coated. Further consequences of this migration include a change in the properties of the adhesive often resulting in loss of removability as well as fading of the image if the migration occurs into substrates which have been printed using thermal imaging techniques. Other methods for insuring removability involve detackifying or externally cross-linking the otherwise tacky pressure sensitive adhesive, a procedure which is sometimes difficult to control and to uniformly reproduce from batch to batch and which often results in insufficient initial adhesion.

SUMMARY OF THE INVENTION

We have now found that the inclusion of low levels, generally less than 0.5%, of an organofunctional silane monomer in conventional acrylate or methacrylate pressure sensitive adhesives provides an adhesive coating with satisfactory initial tack and with little or no adhesion buildup on aging.

Thus, the present invention is directed to acrylate based pressure sensitive emulsion adhesives which have adequate adhesion to most substrates until deliberately pulled off, yet which exhibit substantially no adhesion buildup, even under elevated temperature conditions and which are prepared by the addition to the emulsion adhesive of an effective amount of an organofunctional silane monomer. Thus, the present invention is directed to removable pressure sensitive acrylate or methacrylate based adhesives containing polymerized therein an effective amount of an organofunctional silane monomer.

DETAILED DESCRIPTION OF THE PREFERRED EMBODIMENTS

The alkyl acrylate monomers which comprise the major portion of the pressure sensitive adhesive polymer disclosed herein may include those conventionally used in such pressure sensitive adhesives.

The preferred alkyl acrylates have an average of from about 3 to about 10 carbon atoms in the alkyl groups, and include n-butyl acrylate, amyl acrylate, hexyl acrylate, heptyl acrylate, octyl acrylate, nonyl acrylate, decyl acrylate and various isomers of these acrylates such as isooctyl acrylate or 2-ethylhexyl acrylate. Higher alkyl acrylates can in some instances be used, particularly in combination with the lower alkyl acrylates whereby the average number of carbon atoms in the alkyl groups is within the desired range. The corresponding methacrylate monomers may also be used as may the conventionally employed diesters of dicarboxylic acids such as the $C_1$–$C_8$ alkyl esters of maleic and fumaric acids. Thus, for the purposes of the present invention, the term "acrylate based adhesive" is intended to include adhesives comprising a major portion of at least one of the above classes of monomers.

In most cases it is preferable to have at least about 30% by weight of the acrylate polymer prepared from alkyl acrylates having an average of from 3 to 10 carbon atoms in the alkyl group and in many preferred polymeric compositions, 60% or more are made up of these monomers.

It will be recognized that the combination of monomers used to make up the acrylic polymer will be such as to provide a normally tacky pressure-sensitive material. Thus, within the skill of the art, the polymer can include essentially any ethylenic monomer or mixture of monomers copolymerizable with the other components which do not, in combination with those components, provide unsatisfactory properties such as unsatisfactorily reduced tack. Such other monomers can be of widely varying types, depending upon the specific alkyl acrylate monomers in the interpolymer. For instance, there can be utilized in certain cases one or more vinyl comonomers selected from the group consisting of vinyl esters, such as vinyl acetate; vinyl ethers, such as vinyl ethyl ether; vinyl halides, such as vinyl chloride; vinylidene halides, such as vinylidene chloride; nitriles of ethylenically unsaturated monocarboxylic acids, such as acrylonitrile; monoolefinic hydrocarbons such as ethylene, styrene, vinyl toluene, etc. These comonomers are added in amounts known in the art and the specific amounts thereof are limited primarily by the $T_g$'s of the particular comonomers. Thus, the various comonomers may be employed at concentrations which will result in a final adhesive copolymer having pressure sensitive properties, i.e. having a $T_g$ within the range of about $-60°$ to about $-20°$ C.

It may also be advantageous to use small amounts of certain copolymerizable monomers known to assist in the stability of the copolymer emulsion, e.g., vinyl sulfonic acid. These stabilizers are generally added in amounts of 0.2 to 3% by weight of the monomer mixture.

It is preferred, however, that the acrylate based emulsion contain no strongly polar monomers such as acrylic acid, itaconic acid, cyanoalkyl acrylates, acrylamides, etc. In any case, their presence should be kept to a minimum, i.e. less than 3% by weight and preferably less than about 0.5% by weight.

The preferred pressure sensitive adhesive polymer bases used in the present invention include the interpolymers of 2-ethylhexyl, iso-octyl or butyl acrylate, with methyl methacrylate or vinyl acetate wherein the acrylate ester constitutes not less than 60% of the polymer and wherein the polymer is polymerized to a relatively high molecular weight using conventional free radical initiators.

The organofunctional silanes used in the adhesive polymers are preferably those which will participate directly in the reaction by free-radical polymerization. Typical of silanes of this type are, for example, the vinyl or mercapto-substituted silanes. Representative commercially available silanes of this type include with vinyltrichlorosilane, vinyltriethoxysilane, vinyltrimethoxysilane, vinyltris(2-methoxyethoxy)silane, 3-methacryloxypropyltrimethoxysilane, 3-methacryloxypropyltris(2-methoxyethoxy)silane, vinyltriacetoxysilane, 3-mercaptopropyltrimethoxysilane, 3-mercaptopropyltriethoxysilane, 4-(3-trimethoxysilylpropyl)benzylstyrene sulfonate, 3-acryloxypropyltrimethoxysilane, allyltriethoxysilane, allyltrimethoxysilane, vinylmethyldiethoxysilane, vinyldimethylethoxysilane, vinylmethyldiacetoxysilane, 3-mercaptopropylmethyldimethoxysilane, 3-methacryloxypropylmethyldiethoxysilane, 3-methacryloxypropyldimethylethoxysilane, 3-acryloxypropyldimethylmethoxysilane, etc. Alternatively, silanes which will react with other groups already present in the interpolymer backbone may be employed. Typical of this type of silane are the glycidyl containing silanes which can react with approximately equivalent amounts of other functional groups already present on the polymer. Representative of this type of silane monomer are 3-glycidoxypropyltrimethoxysilane, 2-(3,4-epoxycyclohexyl)ethyltrimethoxysilane, 2-(3,4-epoxy-4-methylcyclohexyl)propylmethyldiethoxysilane, 3-glycidoxypropyldimethylethoxysilane, 3-glycidoxypropylmethyldiethoxysilane, etc.

The amount of the organofunctional silane which is effective herein will vary depending upon a variety of factors including the particular acrylate comonomer(s) used, as well as the type of silane employed. Usually the effective amount will vary within the range of about 0.01 to about 0.5% by weight of the total polymer.

Conventional emulsion polymerization procedures may be used to produce the removable pressure sensitive adhesives of the present invention. Generally, the monomers are interpolymerized in an aqueous medium in the presence of a catalyst, and an emulsion stabilizing amount of an anionic or a nonionic surfactant or mixtures thereof, the aqueous system being maintained by a suitable buffering agent, if necessary, at a pH of 2 to 6. The polymerization is performed at conventional temperatures from about 20° to 110° C., preferably from 50° to 90° C., for sufficient time to achieve a low monomer content, e.g. from 0.5 to about 10 hours, preferably from 2 to about 6 hours, to produce a latex having less than 1.5 percent and preferably less than 0.5 weight percent free monomer. Conventional batch, semi-continuous or continuous polymerization procedures may be employed.

The polymerization is typically initiated by a free radical initiator such as water soluble peroxide, peracid or salt thereof, e.g. hydrogen peroxide, sodium peroxide, lithium peroxide, peracetic acid, persulfuric acid or the ammonium and alkali metal salts thereof, e.g. ammonium persulfate, sodium peracetate, lithium persulfate, potassium persulfate, sodium persulfate, etc. Alternatively, organic peroxides such as benzyl peroxide, t-butyl hydroperoxide, etc. may also be employed. A suitable concentration of the initiator is from 0.05 to 5.0 weight percent and preferably from 0.1 to 3 weight percent.

The free radical initiator can be used alone and thermally decomposed to release the free radical initiating species or can be used in combination with a suitable reducing agent. The reducing agent is typically on oxidizable sulfur compound such as an alkali metal metabisulfite or pyrosulfite, e.g. sodium metabisulfite, sodium formaldehyde sulfoxylate, potassium metabisulfite, sodium pyrosulfite, etc. The amount of reducing agent which can be employed throughout the copolymerization generally varies from about 0.1 to 3 weight percent of the amount of polymer.

The emulsifying agent can be of any of the nonionic or anionic oil-in-water surface active agents or mixtures thereof generally employed in emulsion polymerization procedures. When combinations of emulsifying agents are used, it is advantageous to use a relatively hydrophobic emulsifying agent in combination with a relatively hydrophilic agent. The amount of emulsifying agent is generally from about 1 to about 10, preferably from about 2 to about 8, weight percent of the monomers used in the polymerization.

The emulsifier used in the polymerization can also be added, in its entirety, to the initial charge to the polymerization zone or a portion of the emulsifier, e.g. from 90 to 25 percent thereof, can be added continuously or intermittently during polymerization.

Various protective colloids may also be used in place of or in addition to the emulsifiers described above. Suitable colloids include partially acetylated polyvinyl alcohol, casein, hydroxyethyl starch, carboxymethyl cellulose, gum arabic, and the like, as known in the art of synthetic emulsion polymer technology. In general, these colloids are used at levels of 0.05 to 2% by weight based on the total emulsion.

The adhesive emulsions are produced and used at relatively high solids contents, e.g. between 35 and 70%, preferably not less than 50%, although they may be diluted with water if desired.

If desired, conventional additives may be incorporated into the novel adhesives of our invention in order to modify the properties thereof. Among these additives may be included thickeners, fillers or pigments, such as talc and clay, etc.

The emulsion adhesive is useful on any conventional tape or other face stock including not only paper but also including for example, those substrates made from cotton cloth, nonwoven scrim, printed plastic foils or films or metal or metallized foils. The adhesive may be applied using conventional techniques. Typical methods involve application of the adhesive onto a silicone-coated release liner by use of mechanical coating processes such as air knife, extrusion die, wire-wound rod, knife coater, reverse roll or gravure coating techniques. The adhesive is then typically oven dried and the coated release liner may then be laminated to a face stock using pressure. This technique effects a transfer of the adhesive mass to the face stock which may be preferred when the face stock is porous or heat sensitive.

Alternatively the liquid adhesive may be coated directly onto the face stock and then dried. Variations will depend upon the end use. For example, a self-wound tape may be constructed by optionally treating either one or both sides of the substrate prior to adhesive coating to control the ease of unwinding and avoid transfer of the adhesive from the coated face to the reverse side of the tape. Such treatments may include priming or corona discharge exposure for enhanced adhesive anchorage or silicone or wax coating for improved release. Similarly a note or memo pad may be constructed in which each sheet is coated on the back surface with an adhesive of this invention. Further variations may include double face tapes, transfer films and the like.

It will be apparent that various changes and modifications may be made in the embodiments of the invention described above, without departing from the scope of the invention, as defined in the appended claims, and it is intended therefore, that all matter contained in the foregoing description shall be interpreted as illustrative only and not as limiting of the invention.

EXAMPLE 1

This example illustrates the preparation of a removable pressure sensitive adhesive of the present invention.

To a 5 liter glass round bottom four neck flask equipped with a stirrer, condensor and thermometer, were added the following:
1100 g distilled water,
3.5 g Aerosol MA surfactant (American Cyanamid),
7.5 g Igepal CO850 surfactant (GAF Corp.),
1.2 g sodium acetate,
2.1 g sodium persulfate.
The system was purged with nitrogen for one-half hour at room temperature and 120 g of butyl acrylate was then added after which the reaction was heated to 70° C.

After initiation, a charge of the following was added uniformly over four hours:
(a) an emulsified monomer mix containing:
200 g distilled water,
45 g Aerosol A102 (American Cyanamid),
120 g Igepal CO850,
1230 g butyl acrylate,
150 g methyl methacrylate,
2.4 g Silane A-174 (3-methacryloxypropyltrimethoxysilane available from Union Carbide).
(b) an initiator solution:
120 g distilled water,
3 g sodium acetate,
3.6 g sodium persulfate.
The reaction temperature was maintained at 72°–76° C. After the end of the slow additions the reaction was held for 1 hr at 72°–87° C. to complete reaction. It was then cooled and poured off.

The emulsion designated Emulsion 1, was characterized as follows:
Solids: 50.0%,
pH: 4.6,
Particle size (avg.): 0.20 micron,
Coagulum on 200 mesh screen: <0.01%,
Viscosity: 185 cps,
$T_g$: −47° C.

The emulsion adhesive was then coated on a silicone coated release paper and dried in an oven for 5 minutes at 105° C. The resulting dry adhesive deposition was 12 lbs per ream (3000 sq. feet). The dry adhesive coating was then transferred to a paper face stock having 60 lbs per ream basis weight using a pressure nip roll. This coating was then tested for peel strength according to the Pressure Sensitive Tape Council, Test Method No. 1, modified here to vary the dwell time between placing the coating in contact with the stainless steel test panel and measuring the peel strength. In addition the bonded test specimen was heat aged as indicated in Table I to accelerate any tendency to build adhesion on aging.

In a similar manner, five other adhesives were prepared using various ratios of the comonomers. The composition of the adhesive as well as the test results thereof are shown in Table I.

TABLE I

| Emulsion | 1 | 2 | 3 | 4 | 5 | 6 |
|---|---|---|---|---|---|---|
| Composition | | | | | | |
| Butyl Acrylate | 90 | 90 | 80 | 80 | 90 | 80 |
| Methyl Methacrylate | 10 | 10 | — | — | 10 | — |
| Vinyl Acetate | — | — | 20 | 20 | — | 20 |
| Silane A-174 | 0.15 | 0.5 | 0.15 | 0.5 | 0 | 0 |
| Peel Strength (pli) | | | | | | |
| 20 min. @ 22° C. | 0.32 | 0.01 | 0.42 | 0.08 | 0.55 | 1.0 |
| 2 hr @ 22° C. | 0.33 | 0.01 | 0.34 | 0.07 | 1.6 | 1.5 |
| 7 days @ 22° C. | 0.37 | 0.01 | 0.69 | 0.11 | 2.2 | Tear (4.0) |
| 7 days @ 50° C. | 0.33 | 0.01 | 0.78 | 0.11 | Tear (3.9) | Tear (5.6) |

The results presented above show that the peel strength of the adhesive coatings prepared in accordance with the teachings of the present invention remains essentially constant and the coatings are clearly removable from the panels indicating no buildup with aging. In contrast, Emulsions 5 and 6 which contain no silane, give coatings which show a substantial increase in peel strength on aging and are not cleanly removable from the test panels.

EXAMPLE II

Three additional emulsions were prepared as in Example I using different silanes. The formulations and testing results are shown in Table II.

TABLE II

| Emulsion | 7 | 8 | 9 |
|---|---|---|---|
| Composition | | | |
| Butyl Acrylate | 90 | 90 | 90 |
| Methyl Methacrylate | 10 | 10 | 10 |
| Silane A-151[1] | 0.12 | — | — |
| Silane A-172[2] | — | 0.18 | — |
| Silane A-189[3] | — | — | 0.24 |
| Peel Strength (pli) | | | |
| 20 min @ 72° F. | 0.73 | 0.56 | 0.79 |
| 2 hrs @ 72° F. | 0.91 | 0.81 | 0.69 |
| 7 days @ 72° F. | 0.95 | 1.3 | 0.85 |
| 7 days @ 120° F. | 1.6 | 1.3 | 1.5 |

[1]Union Carbide Vinyltriethoxysilane
[2]Union Carbide Vinyltris(2-methoxyethoxy)silane
[3]Union Carbide 3-mercaptopropyltrimethyoxysilane In all cases, there was little adhesion build up on aging and all coatings were cleanly removable from the test panels.

EXAMPLE III

This example shows the results of another change in the major backbone monomer composition of Emulsion 1 while retaining the same type and level of silane. The composition and tests results of the emulsions are shown in Table III.

TABLE III

| Emulsion | 10 | 11 |
|---|---|---|
| Butyl Acrylate | 60 | 60 |
| 2-Ethylhexyl Acrylate | 40 | 40 |
| Silane A-174 | 0.16 | 0 |
| Peel Strength (pli) | | |
| 20 min @ 22° C. | 0.29 | Transfer (1.3) |
| 24 hr @ 22° C. | 0.11 | Transfer (1.6) |
| 7 days @ 22° C. | 0.16 | Transfer/Tear (2.2) |
| 7 days @ 50° C. | 0.10 | Transfer (2.5) |

The peel strength of a coating made from Emulsion 10 does not increase with time and the adhesive coating is cleanly removable from the test panel. In contrast, a coating made from Emulsion 11, lacking the silane, builds in adhesion with time and the adhesive coating is not cleanly removable but transfers from the paper face stock to the test panel.

It will be recognized that other conventionally known acrylate-based pressure sensitive adhesives will exhibit similar improvements with respect to clean removability after aging by the addition thereto of the organofunctional silanes in accordance with the teaching of the present invention.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. In an acrylate based pressure sensitive emulsion adhesive having a Tg of about −60° to about −20° C. the improvement which comprises polymerizing therein an effective amount of an organofunctional silane monomer thereby improving the removability of the adhesive.

2. The adhesive of claim 1 wherein the organofunctional silane monomer added in an amount of 0.01 to 0.5% by weight of the solids of the emulsion adhesive.

3. The adhesive of claim 1 wherein the organofunctional silane monomer is a vinyl or mercapto-substituted silane.

4. The adhesive of claim 3 wherein the organofunctional silane monomer is selected from the group consisting of vinyltrichlorosilane, vinyltriethoxysilane, vinyltrimethoxysilane, vinyltris(2-methoxyethoxy)silane, 3-methacryloxypropyltrimethoxysilane, 3-methacryloxypropyltris(2-methoxyethoxy)silane, vinyltriacetoxysilane, 3-mercaptopropyltrimethoxysilane, 3-mercaptopropyltriethoxysilane, 4-(3-trimethoxysilylpropyl)benzylstyrene sulfonate, 3-acryloxypropyltrimethoxysilane, allyltriethoxysilane, allyltrimethoxysilane, vinylmethyldiethoxysilane, vinyldimethylethoxysilane, vinylmethyldiacetoxysilane, 3-mercaptopropylmethyldimethoxysilane, 3-methacryloxypropylmethyldiethoxysilane, 3-methacryloxypropyldimethylethoxysilane, and 3-acryloxypropyldimethylmethoxysilane.

5. The adhesive of claim 4 wherein the organofunctional silane monomer is selected from the group consisting of vinyltrichlorosilane, vinyltriethoxysilane, vinyltrimethoxysilane, vinyltris(2-methoxyethoxy)silane, 3-methacryloxypropyltrimethoxysilane, 3-methacryloxypropyltris(2-methoxyethoxy)silane, vinyltriacetoxysilane, 3-mercaptopropyltrimethoxysilane, 3-mercaptopropyltriethoxysilane, 4-(3-trimethoxysilylpropyl)benzylstyrene sulfonate, 3-acryloxypropyltrimethoxysilane, allyltriethoxysilane, and allyltrimethoxysilane.

6. The adhesive of claim 1 wherein the organofunctional silane monomer is selected from this group consisting of silane monomer are 3-glycidoxypropyltrimethoxysilane, 2-(3,4-epoxycyclohexyl)ethyltrimethoxysilane, 2-(3,4-epoxycyclohexyl)ethyltrimethoxysilane, 2-(3,4-epoxy-4-methylcyclohexyl)propylmethyldiethoxysilane, 3-glycidoxypropyldimethylethoxysilane, and 3-glycidoxypropylmethyldiethoxysilane.

7. The adhesive of claim 1 wherein the pressure sensitive emulsion adhesive comprises at least about 30% by weight of an acrylate polymer prepared from alkyl acrylates having an average of from 3 to 10 carbon atoms in the alkyl group.

8. The adhesive of claim 7 wherein at least about 60% by weight of the acrylate polymer is prepared from alkyl acrylates having an average of from 3 to 10 carbon atoms in the alkyl group.

9. The adhesive of claim 8 wherein the pressure sensitive emulsion adhesive comprises an interpolymer of 2-ethylhexyl, iso-octyl or butyl acrylate with methyl methacrylate.

10. The adhesive of claim 8 wherein the pressure sensitive emulsion adhesive comprises an interpolymer of 2-ethylhexyl, iso-octyl or butyl acrylate with vinyl acetate.

11. A substrate having coated thereon the removable pressure sensitive adhesive of claim 1.

12. A substrate having coated thereon the removable pressure sensitive adhesive of claim 4.

13. In a process for the preparation of an acrylate based pressure sensitive emulsion adhesive having a Tg of about −60° to about −20° C. the improvement which comprises the step of polymerizing therein an effective amount of an organofunctional silane monomer thereby improving the removability of the adhesion.

14. The process of claim 13 wherein wherein the organofunctional silane monomer is added in an amount of 0.01 to 0.5% by weight of the solids of the emulsion adhesive.

15. The process of claim 13 wherein the organofunctional silane monomer is a vinyl or mercapto-substituted silane.

16. The process of claim 13 wherein the organofunctional silane monomer is selected from the group consisting of vinyltrichlorosilane, vinyltriethoxysilane, vinyltrimethoxysilane, vinyltris(2-methoxyethoxy)silane, 3-methacryloxypropyltrimethoxysilane, 3-methacryloxypropyltris(2-methoxyethoxy)silane, vinyltriacetoxysilane and 3-mercaptopropyltrimethoxysilane 3-mercaptopropyltriethoxysilane, 4-(3-trimethoxysilylpropyl)benzylstyrene sulfonate, 3-acryloxypropyltrimethoxysilane, allyltriethoxysilane, allyltrimethoxysilane, vinylmethyldiethoxysilane, vinyldimethylethoxysilane, vinylmethyldiacetoxysilane, 3-mercaptopropylmethyldimethoxysilane, 3-methacryloxypropylmethyldiethoxysilane, 3-methacryloxypropyldimethylethoxysilane, and 3-acryloxypropyldimethylmethoxysilane.

17. The process of claim 16 wherein the organofunctional silane monomer is selected from the group consisting of vinyltrichlorosilane, vinyltriethoxysilane, vinyltrimethoxysilane, vinyltris(2-methoxyethoxy)silane, 3-methacryloxypropyltrimethoxysilane, 3-methacryloxypropyltris(2-methoxyethoxy)silane, vinyltriacetoxysilane, 3-mercaptopropyltrimethoxysilane, 3-mercaptopropyltriethoxysilane, 4-(3-trimethoxysilylpropyl)benzylstyrene sulfonate, 3-acryloxypropyltrimethoxysilane, allyltriethoxysilane, and allyltrimethoxysilane.

18. The process of claim 13 wherein the organofunctional silane monomer is selected from this group consisting of 3-glycidoxypropyltrimethoxysilane, 2-(3,4-epoxycyclohexyl)ethyltrimethoxysilane, 2-(3,4-epoxycyclohexyl)ethyltrimethoxysilane, 2-(3,4-epoxy-4-methylcyclohexyl)propylmethyldiethoxysilane, 3-glycidoxypropyldimethylethoxysilane, and 3-glycidoxypropylmethyldiethoxysilane.

19. The process of claim 13 wherein the pressure sensitive emulsion adhesive comprises at least about 30% by weight of an acrylate polymer prepared from alkyl acrylates having an average of from 3 to 10 carbon atoms in the alkyl group.

* * * * *